(12) United States Patent
Van Der Brug

(10) Patent No.: US 9,907,146 B2
(45) Date of Patent: Feb. 27, 2018

(54) LIGHT SYSTEM INTERFACE AND METHOD

(71) Applicant: PHILIPS LIGHTING HOLDING B.V., Eindhoven (NL)

(72) Inventor: Willem Peter Van Der Brug, Best (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/503,505

(22) PCT Filed: Jul. 28, 2015

(86) PCT No.: PCT/EP2015/067196
§ 371 (c)(1),
(2) Date: Feb. 13, 2017

(87) PCT Pub. No.: WO2016/023742
PCT Pub. Date: Feb. 18, 2016

(65) Prior Publication Data
US 2017/0245349 A1 Aug. 24, 2017

(30) Foreign Application Priority Data
Aug. 11, 2014 (EP) .................................... 14180461

(51) Int. Cl.
*H05B 37/02* (2006.01)
*H05B 33/08* (2006.01)
*H04L 29/08* (2006.01)

(52) U.S. Cl.
CPC ..... *H05B 37/0254* (2013.01); *H05B 33/0845* (2013.01); *H04L 67/12* (2013.01)

(58) Field of Classification Search
None
See application file for complete search history.

(56) References Cited

U.S. PATENT DOCUMENTS 8,308,332 B1  11/2012  Suhr
8,523,397 B1  9/2013  Gordin
(Continued)

FOREIGN PATENT DOCUMENTS

CN  103108452 A  5/2013
CN  203010508 U  6/2013
(Continued)

OTHER PUBLICATIONS

"Ola LED Pixels," From wiki.openlighting.org, Revision as of Sep. 2013, Last Viewed May 2, 2015 (6 Pages).
(Continued)

*Primary Examiner* — Dedei K Hammond

(57) ABSTRACT

A light system interface for controlling an arena light system, the light system interface comprising: an input configured to receive a first protocol message, the first protocol message being configured to define at least one control parameter associated with an emulated light source, the at least one control parameter designed to produce an emulated visual effect when performed on the emulated light source; a protocol message generator configured to generate at least one second protocol message based on the first protocol message and a mapping between the emulated light source and at least two arena light system light sources including knowledge on the arena light system light sources with respect to location and direction, the at least one second protocol message being configured to define control parameters associated with the arena light system light sources; and an output configured to output the second protocol message to the network of arena light system light sources, such that the control parameters associated with the arena light system light sources are configured to enable the performance by the network of arena light system light sources of the emulated visual effect.

13 Claims, 7 Drawing Sheets

(56) References Cited

U.S. PATENT DOCUMENTS

| | | |
|---|---|---|
| 2005/0207177 A1 | 9/2005 | Guy |
| 2005/0275626 A1* | 12/2005 | Mueller ............. H05B 37/0245 345/156 |
| 2009/0197710 A1 | 8/2009 | Ronda |
| 2010/0110671 A1 | 5/2010 | Gordin et al. |
| 2011/0285854 A1 | 11/2011 | Laduke et al. |

FOREIGN PATENT DOCUMENTS

| | | |
|---|---|---|
| GB | 2350997 A | 12/2000 |
| JP | H0684403 A | 3/1994 |
| KR | 20130067654 A | 6/2013 |
| RU | 60109 U1 | 1/2007 |
| RU | 2490045 C1 | 8/2013 |
| WO | 9602718 A1 | 2/1996 |
| WO | 2008139369 A1 | 11/2008 |
| WO | 2010004480 A1 | 1/2010 |
| WO | 2012027414 A2 | 3/2012 |
| WO | 2012049656 A2 | 4/2012 |
| WO | 2012131544 A1 | 10/2012 |
| WO | 2013088394 A2 | 6/2013 |

OTHER PUBLICATIONS

"LED Moving Head Lights—X Prolighting," http://x-prolight.en.alibaba.com/productgrouplist-213499766/led_moving_head_light_series.htm., Dec. 2013 (1 Page).

"LED Square Moving Head Light," http://www.szbecen.com/sdp/1035389/4/pd-5040248/6269420-2143192/led_square_moving_head_light_BC-232.html, Dec. 2013 (1 Page).

"Moving Head LED Zoom Stage Light With 3 Virtual Color Wheel," http://www.alibaba.com/product-gs/1535990533/36pcs_10W_Moving_Head_Led_Zoom.html?s=p, Dec. 2013 (1 Page).

* cited by examiner

LIGHT SYSTEM INTERFACE AND METHOD

CROSS-REFERENCE TO PRIOR APPLICATIONS

This application is the U.S. National Phase application under 35 U.S.C. § 371 of International Application No. PCT/EP2015/067196, filed on Jul. 28, 2015, which claims the benefit of European Patent Application No. 14180461.7, filed on Aug. 11, 2014. These applications are hereby incorporated by reference herein.

FIELD OF THE INVENTION

This invention is generally related to a light system interface and method, and in particular a light system interface and method which is compatible with arena or stadium lighting systems.

BACKGROUND OF THE INVENTION

In high-end arena (field, pitch or stadium) lighting, like the Philips ArenaVision products, a large number of luminaires are distributed around an arena or stadium to create a uniform light intensity on the field or pitch, for example a football field. Currently the lamps offered to customers are ballasted (usually simple EM ballasts) high intensity discharge (eHID) high power lamps (with a power level of 2000 Watts) which are not able to dim fast and as such are unsuitable for producing dynamic effects.

However it has been discussed that other light technologies such as LED luminaires and drivers could be employed which would be suitable to be controlled to produce dynamic effects. From theatre shows it is well known that dynamic light effects can contribute significantly to the impact of the show. People become excited and experience a more intense atmosphere compared to a situation where only static lighting is used.

Controlling lighting systems in theatres is typically performed by the use of a light controller or console outputting a suitable lighting control protocol to the light controllers associated with the lights. For example DMX (also known as DMX512 or Digital multiplex) is a lighting controls standard which is mainly used in theatre and concert lighting systems. It offers control of 256 dim levels for up to 512 lamps, updated 44 times per second or faster. DMX defines many types of light fixtures, from simple 8-bit dimmed white lamps to RGB moving head lights with strobo's and gobo's. Remote Device Management or RDM is a protocol enhancement to DMX that allows bi-directional communication between a lighting or system controller and attached RDM compliant devices over a standard DMX line. RDM allows configuration, status monitoring, and management of these devices in such a way that does not disturb the normal operation of standard DMX devices that do not recognize the RDM protocol. Art-Net is a protocol for transmitting the lighting control protocol DMX (and with RDM) over the User Datagram Protocol of the Internet Protocol suite. In other words Art-Net is an Ethernet/IP version of DMX, in which multiple DMX universes can be controlled over a standard Ethernet network.

Creating (dynamic) scenes with a light controller (console) is a complex and time consuming job. This is significantly more complex and time consuming when attempting to generate scenes using arena or stadium lighting. When arena or pitch lighting is offered to an event controller as a series of DMX addresses operating hundreds of static lights, a light operator will have to do extensive training and programming on the light console before effective and impressive dynamic effects can be generated. In light systems involving a multitude of independent light fixtures, it is therefore generally impossible to offer use of such light system to a temporary user. The effort to interface such a light system to the temporary user is generally too high. As an example, the building lighting systems of venues hosting a visiting/travelling concert are generally not used by the lighting operator of the concert due to the high effort of interfacing the light fixtures to the light console of the concert.

To overcome such difficulty a separate lighting system, such as an underground/floor lighting dedicated to provide dynamic lighting effects has been discussed. For example U.S. Pat. No. 8,308,332 discloses a system for illuminating a sports field covered with turf, including a plurality of light arrays configured to be positioned in a spaced-apart manner under a portion of the turf and oriented to emit light upwards through the turf and a control system for selectively controlling activation of the light arrays to provide illuminated markers on the sports field. However the implementation of separate lighting systems for effects and illumination is costly both in terms of power consumption, control and installation/maintenance disruption.

US 2005/0275626 A1 discloses methods and systems for providing audio/visual control systems that also control lighting systems, including for advanced control of lighting effects in real time by Video Jockeys and similar professionals.

SUMMARY OF THE INVENTION

To address the above concern, the invention is defined by the claims.

According to an embodiment of the invention, there is provided a light system interface for controlling an arena light system comprising a network of arena light system light sources, the light system interface comprising: an input configured to receive a first protocol message, the first protocol message being configured to define at least one control parameter associated with an emulated light source, the at least one control parameter when performed on the emulated light source is designed to produce an emulated visual effect; a protocol message generator having knowledge on the arena light system light sources with respect to the location and direction of the individual light sources in said network and configured to generate at least one second protocol message based on the first protocol message, a mapping between the emulated light source and a network of arena light system light sources including said knowledge, the at least one second protocol message being configured to define control parameters associated with a plurality of the arena light system light sources; and an output configured to output the second protocol message to the network of arena light system light sources, such that the control parameters associated with the plurality of arena light system light sources are configured to enable the network of arena light system light sources to produce a visual effect based on the emulated visual effect. Thus in such embodiments the light system interface permits a complex lighting system to implement a designed lighting effect from an emulated light source using a control parameters associated with the emulated light source being mapped into control parameters for the arena light sources and therefore enable an operator or programmer of a light console/controller to produce good dynamic light effects using only knowledge on the emulated light source and not on the arena light sources.

The protocol message generator may be further configured to generate the mapping based on information on an emulated light source DMX personality file, and information on at least one DMX personality file for a light source within the network of arena light system light sources. In such a manner as described herein the light system interface is able to handle a first protocol message in the form of a DMX message defined by a personality file associated with the emulated light source and generate suitable DMX protocol messages for the plurality of light sources within the network of arena light sources as defined by the personality files of the arena light sources and thus allow an operator to define an effect using the first protocol message based on the emulated light source personality file definitions without needing to know the arena light source DMX personality file definitions.

The first protocol message may comprise at least one first protocol message frame comprising a number of sequentially arranged message slots, wherein each of the at least one control parameters associated with a emulated light source may be represented by at least one message slot within the at least one first protocol message, and wherein the second protocol message comprises at least one second protocol message frame each of the at least one second protocol message frames may comprise a further number of sequentially arranged message slots, wherein each of the control parameters associated with the plurality of the arena light system light sources may be represented by at least two message slots within the at least one second protocol message. In such a manner the DMX message received comprises frames and within each frame may be subdivided into DMX slots of 8 bits. The control parameters, such as dim levels can be defined as one or more DMX slots. Furthermore the frame slot ordering may be defined by the personality file of the light source.

The light system interface may be a DMX bridge wherein the first protocol message is a DMX message and the second protocol message is a DMX message. In such embodiments the input is therefore a DMX message frame which comprise slots defining control parameters for the emulated light source which may then be mapped to an output DMX message comprising one or more DMX frames which comprise slots defining control parameters for the light sources within the network of arena light sources. The light system interface may be an Art-Net bridge wherein the first protocol message is an Art-Net message associated with a first universe value and the second protocol message is at least one of: an Art-Net message associated with the first universe value; an Art-Net message associated with a second universe value; and a DMX message associated with a second universe value. In such implementations as described herein the light system interface is able to handle a protocol message for the emulated light source and generate suitable control parameters within a second protocol message for the plurality of light sources within the network of arena light sources and thus allow an operator to define an effect using the first protocol message based on the personality file definitions or the emulated light without needing to know the light source personality file definitions for the arena network.

The emulated light source may be a single dimmable fixture for the entire arena, and the network of arena light system light sources may comprise a plurality of light sources within the arena light system generating light at a determined area, wherein the protocol message generator may be configured to map a first dim level value associated with the single dimmable fixture for the arena to at least one second dim level value associated with the plurality of the light sources within the arena light system. In these implementations, called stadium 'fade to black', a controllable dimming operation using multiple light sources can produce a range of dimming levels greater than can be provided by a single light source variation. Furthermore this can be controlled easily using a simple emulated dimming control.

The emulated light source may be a multitude of dimmable fixtures aimed at determined areas within the arena, and the network of arena light system light sources may comprise groups of light sources within the arena light system generating light at the determined areas, and the protocol message generator may be configured to map a first message dim level value associated with one of the multitude of dimmable fixtures aimed at one of the determined areas to at least one second dim level value associated with light sources within the groups of the light sources generating light at the one of the determined areas. In such implementations a complex controllable dimming operation using multiple light sources can be implemented. Furthermore using the mapping it may be possible to produce a range of dimming levels for the arena over the determined areas by a single emulated light source dimming control associated with a determined area of the arena.

The emulated light source may be at least one moving head fixture within the arena, and the network of arena light system sources may comprise groups of light sources within the arena light system generating light at determined areas, and the protocol message generator may be configured to map a first light beam location value or orientation value associated with the at least one moving head fixture to at least one second message dim level value associated with the groups of the light sources within the arena light system directed at the location associated with the first light beam location value or orientation value. In such implementations a complex controllable dimming operation using multiple light sources can produce an effect of a 'moving head' light for the arena over the location defined by the aiming location value or the 'orientation' or the emulated moving head fixture. Furthermore control of the network of the arena lights is therefore achieved using control parameters associated with a single emulated light source.

A light system may comprise: a console/controller configured to generate the first protocol message; a light system interface as described herein; and a plurality of light sources, each light source configured to receive an associated one of the second protocol messages.

The console/controller may be configured to receive a location identifier and wherein the first protocol message may comprise a first control parameter based on the location identifier, a second control parameter based on a centre of light pattern light level, a third control parameter based on a peripheral light pattern light level, and a fourth control parameter based on a light pattern width, the light system interface protocol message generator may be configured to generate a second protocol message comprising dim levels associated with the plurality of the light sources within the arena light system such that the light sources illuminate a focus area identified by the location identifier and the light pattern width at the centre of light pattern light level and illuminate the area outside the focus area at the peripheral light pattern light level. In such embodiments an action of following a feature, such as a ball, puck or player within the arena can be controlled simply by providing the single moving head orientation parameter which has an expected aiming location (or light pattern centre), light pattern width, and lighting levels for areas within the light pattern centre and peripheral light pattern. In other words a control parameters can be provided for an expected light level for a focus area (a 'centre of a light pattern') and an expected light level outside of a focus area (a 'peripheral light pattern'). The focus area may furthermore itself be defined by a location identifier indicating a 'centre' of the light pattern and light pattern width.

The first protocol message may further comprise: a fifth control parameter based on a light pattern shape, wherein the light system interface protocol message generator may be configured to generate the second protocol message comprising dim levels associated with the plurality of the light sources within the arena light system further based on the moving head light pattern shape.

The first protocol message may further comprise: a fifth control parameter based on the moving head orientation parameter speed, wherein the light system interface protocol message generator being configured to generate the second protocol message comprising dim levels associated with the plurality of the light sources within the arena light system further based on the moving head orientation parameter speed. In such embodiments fast moving features can be further highlighted over slow moving features, and thus make quick and often difficult to see elements clearer.

The light system may further comprise a moving head orientation input and generate a location identifier to be sent to the console/controller. The light system may further comprise a moving head orientation parameter determiner configured to receive at least one camera image and determine a location identifier or moving head orientation parameter for an emulated moving head light fixture based on a location of a feature in the at least one camera image. The light system may further comprise a moving head orientation parameter determiner configured to receive at least one camera image and determine a location identifier or moving head orientation parameter for an image centre captured by the camera.

According to a second aspect there is provided a method of light system interfacing an arena light system comprising a network of arena light system light sources, the method comprising: receiving a first protocol message comprising at least one control parameter associated with a single emulated light source, the at least one control parameter when performed on the single emulated light source being designed to produce an emulated visual effect; generating at least one second protocol message based on the first protocol message and a mapping between the emulated light source and the network of arena light system light sources including knowledge on the arena light system light sources with respect to the location and direction of the individual light sources in said network, the at least one second protocol message being configured to define control parameters associated with a plurality of arena light system light sources; and outputting the second protocol message to the network of arena light system light sources, such that the second protocol message is configured to enable the plurality of arena light system light sources to produce a visual effect based on the emulated visual effect.

Generating a mapping may further comprise generating the mapping based on information on an emulated light source DMX personality file, and information on at least one DMX personality file for a light source within the network of arena light system light sources.

The first protocol message may comprise at least one first protocol message frame comprising a number of sequentially arranged message slots, wherein each of the at least one control parameters associated with an emulated light source may be represented by at least one message slot within the at least one first protocol message. The second protocol message may comprise at least one second protocol message frame, wherein each of the at least one second protocol message frames may comprise a further number of sequentially arranged message slots, wherein each of the control parameters associated with the arena light system light sources may be represented by at least one message slot within the at least one second protocol message.

Receiving a first protocol message may comprise receiving a DMX message; and wherein generating a second protocol message based on the first protocol message may comprise generating a DMX message.

Receiving a first protocol message may comprise receiving an Art-Net message associated with a first universe value; and wherein generating a second protocol message based on the first protocol message may comprise generating at least one of: an Art-Net message associated with the first universe value; an Art-Net message associated with a second universe value; and a DMX message associated with a second universe value.

The emulated light source may be a single dimmable fixture for the entire arena, and the network of arena light system light sources may comprise a plurality of light sources within the arena light system generating light at a determined area, wherein generating at least one second protocol message may comprise mapping a first dim level value associated with the single dimmable fixture for the arena to at least one second dim level value associated with the plurality of the light sources within the arena light system.

The emulated light source may be at least one moving head fixture within the arena, and the network of arena light system sources may comprise groups of light sources within the arena light system generating light at determined areas, and generating at least one second protocol message may comprise mapping a first light beam location value or orientation value associated with the at least one moving head fixture to at least one second dim level value associated with the groups of the light sources within the arena light system directed at the location associated with the first light beam location value or orientation value.

The method may comprise: generating the first protocol message; interfacing an arena light system as described herein; and receiving at the network of arena light sources an associated one of the second protocol messages.

The method may further comprise receiving a location identifier and wherein generating the first protocol message may comprise generating a first control parameter based on the location identifier, generating a second control parameter based on a centre of light pattern light level, generating a third control parameter based on a peripheral light pattern light level; and generating a fourth control parameter based on a light pattern width; generating a second protocol message may comprise generating a second protocol message comprising dim levels associated with the plurality of the light sources within the arena light system such that the light sources illuminate parameter focus area identified by the location identifier and the light pattern width at the centre of light pattern light level and illuminate the area outside of the focus area at the peripheral light pattern light level.

Generating the first protocol message may further comprise: generating a fifth control parameter based on a light pattern shape, wherein generating the second protocol message may comprise generating the second protocol message comprising dim levels associated with the plurality of the light sources within the arena light system further based on the light pattern shape.

Generating the first protocol message may further comprise: generating a fifth control parameter based on an orientation parameter speed, wherein generating the second protocol message may comprise generating the second protocol message comprising dim levels associated with the plurality of the light sources within the arena light system further based on the orientation parameter speed. In such embodiments fast moving features can be further highlighted over slow moving features, and thus make quick and often difficult to see elements clearer.

The method may further comprise receiving a user input comprising a location identifier. The light system may further comprise receiving at least one camera image and determining a location identifier based on a location of a feature in the at least one camera image.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
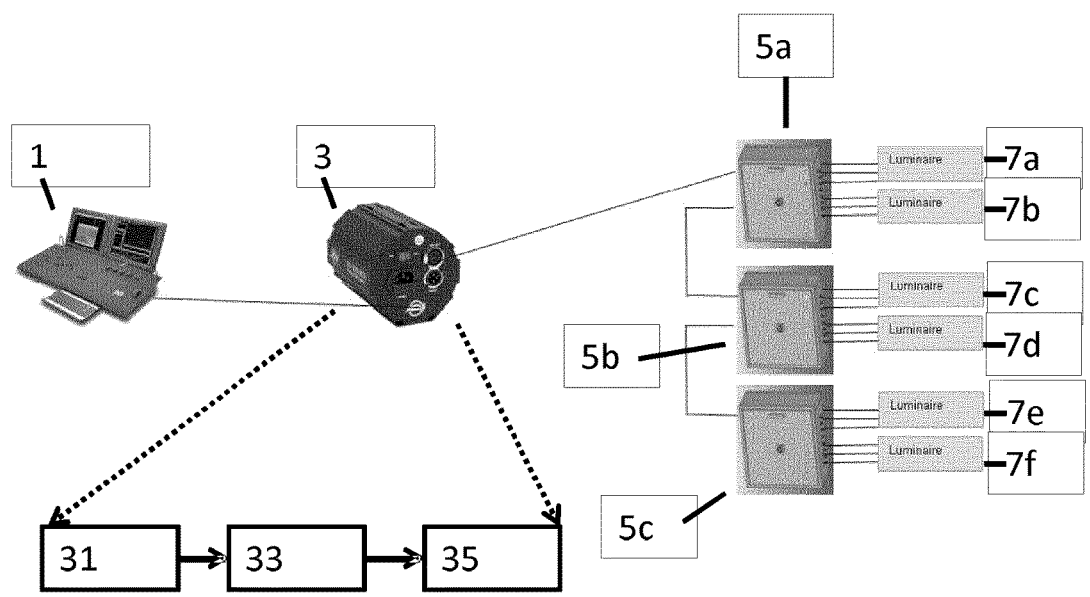
FIG. 1 shows an example lighting system comprising a DMX bridge light system interface according to some embodiments.

The system according to embodiments herein is to a light system interface for controlling an arena light system. In the following description it would be understood that the term arena or stadium is to be interpreted broadly to cover any suitable architectural lighting system or façade lighting system. Such a light system interface comprises an input configured to receive a first protocol message. The first protocol message is configured to define at least one control parameter associated with an emulated light source. Furthermore the at least one control parameter when performed on the emulated light source is designed to produce an emulated visual effect. The interface furthermore comprises a protocol message generator configured to generate at least one second protocol message based on the first protocol message and a mapping between the emulated light source and a network of arena light system light sources. The at least one second protocol message is configured to define control parameters associated with the arena light system light sources. These second protocol messages furthermore may be output to the network of arena light system light sources. When the control parameters associated with the arena light system light sources are output the control parameters enable the network of arena light system light sources to produce a visual effect based on the emulated visual effect. Thus in such embodiments the light system interface enables an entire lighting system to be offered to the light console or controller as one or more known type(s) of light fixture operating as an emulated light source.

The lighting system may comprise multiple luminaires (or light sources) where a group (or collection) of luminaires are directed or pointed towards the same spot on the arena or sports field. Each group or collection of luminaires in such a system can be offered to the light console or controller as one emulated luminaire. In other words the operator of the lighting system can 'see' a emulated light source as a single addressable unit or personality within which elements of the personality such as dimming levels, colour can be defined.

In some embodiments the lighting system comprising the multiple luminaires or light sources can be 'offered' to the light console or controller as one single addressable light fixture (or a single personality), requiring only a single address patch on the light console to control the output of the lighting system. In such a manner where dimming in DMX levels is close to 0, the light system interface can be configured to generate control messages to the luminaires throughout the system enabling them to extinguish in a logical way. Similarly the lighting system can as described herein generate protocol messages to control or dynamically operate all of the arena or pitch lighting lamps in such a way that they create a desired 2-D light intensity profile that follows the sports event based on a simple or single personality protocol message defining a 'moving head' light source. In one embodiment, the light can be configured to follow the ball as it moves in play.

As discussed previously the energy consumption of arena or stadium lighting (pitch lighting) is a small but growing concern for stadium owners. A typical pitch lighting system can consist of 300 luminaires of 2000 W each, and as such require a total of 600 kW to operate. During one evening of sports the lamps are typically lighted for 5 hours, costing 3000 kWh of energy. This is a minor cost at large events, but a significant one for small ones and as running costs in testing and programming of the light console to attempt to produce suitable dynamic lighting effects, and non-event usage such as team training, maintenance, and grass cutting at night.

Furthermore the dynamic range per luminaire over which dimming is possible is determined by the capabilities of the electronic driver and the LED modules. Typical high-performance parameters are 1% dimming capability, which is already considered a challenge for LED drivers. As pitch lighting creates typical light levels of 2000 lux, at 1% the deepest dim level the light level will still be 20 lux, 3-10 times the light level typical for street lighting (burning at maximum intensity!). For an arena lighting system to cater to a large range of applications it is important that the dim level can be varied over a large range. As described herein it is planned that the lighting system should be able to interface with standard light consoles, often just for one night for a specific concert. For certain applications, like background lighting for camera recording during concerts, the light level should be very low, down to a few lux. Also for "fade to black" the effects are more sophisticated if the system can provide deep dim levels. In an arena lighting system plan, usually multiple light sources (or beams) are directed towards the same spot on the sports field, often from multiple source locations. This is to reduce shadows and to limit the effect of one failing lamp. For a "Fade to black" effect for instance, in which the operator wants the total light system to smoothly and consistently fade from 100% to complete OFF, a lot of programming is involved to let lamps shut down after each other sequentially for the "last section" to black.

With respect to FIG. 1 an example lighting system comprising a light system interface is shown. The lighting system comprises a console or lighting controller 1 configured to generate suitable lighting protocol messages. For example the console or controller 1 can be configured to generate DMX or digital multiplex protocol messages. A DMX protocol message typically comprises control data for a light source, the control data or parameters being defined based on a personality files or file. Each personality file describing or defining the control parameters which enable the operation of a single light source or emulated light source. Furthermore each personality file defines the organisation or order of the control parameters. For example a DMX message can comprise a message frame comprising multiple slots. Each slot is 8 bits long. A slot or group of slots typically defines a control parameter associated with a light source. It is understood that any single message frame can comprise slots associated with more than one light source. This is known as patching where fixtures or light sources occupy a certain amount of DMX slots within a DMX frame. The number of slots which are required for each type of light source is defined by a personality file associated with the source. For example a personality file may define a first slot associated with a dimming or dim level for the light source. The same personality file can further define that further slots are associated with other characteristics or control parameters such as colour, moving head orientations, Go-before-optics (Gobo's) parameters, and Stroboscopic (Strobe's) parameters.

In the example herein the DMX message generated by the console 1 comprises a message comprising control parameters (or slots within the DMX message frame) defined by a single personality file associated with an emulated light. The DMX message can be output via a suitable connection to the light system interface 3.

The light system interface 3, or DMX bridge, is a configured to receive the emulated light or light source DMX messages and output suitable messages (such as DMX protocol messages to be output to controllers of individual light sources or luminaires within the arena light system network in order that the multiple luminaires or light sources can be 'offered' to the light console or controller as one single addressable light fixture (or a single personality), requiring only a single address patch on the light console to control the output of the lighting system.

Figure 7:
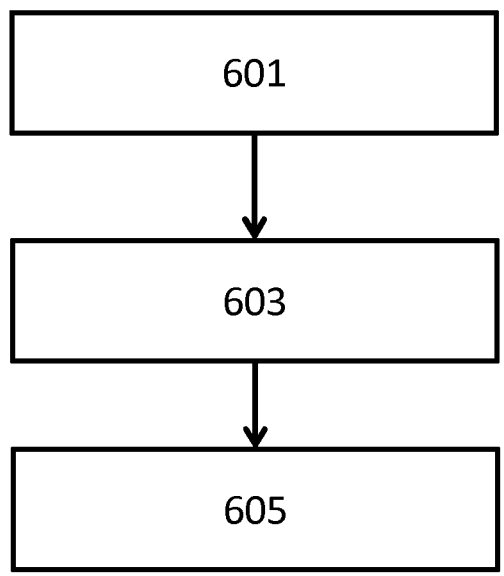
FIG. 7 show a flow diagram of the operation of the light system interface according to some embodiments.

With respect to FIG. 7 the operation of the light system interface is shown. The light system interface receives a first protocol message. The operation of receiving a first protocol message (DMX) comprising control parameters defining a control of an emulated light source is shown in FIG. 7 by step 601.

The light system interface generates a second protocol message (DMX) based on the first protocol message. The operation of generating a second protocol message (DMX) based on the first protocol message is shown in FIG. 7 by step 603.

The light system interface outputs the generated second protocol messages. The operation of outputting the second protocol messages is shown in FIG. 7 by step 605.

With respect to FIG. 1 the structure of the light system interface 3 in some embodiments is shown in further detail. In some embodiments the light system interface 3 comprises an input 31 configured to receive the first protocol (DMX) messages. The first protocol messages as discussed herein comprise control parameters associated with an emulated light source. The control of the emulated light source being that offered to the user of the lighting system rather than offering control of individual light sources from the network of light sources within the arena.

The light system interface 3 further comprises a protocol message generator 33 configured to generate suitable protocol messages based on the received DMX message. The protocol message generator 33 comprises a mapping unit configured to receive the single personality file (DMX) message and generate suitable (DMX) messages to be output to at least some of the network of arena light sources. Each message may address and define control parameters of the light sources (or luminaires) within the network of light sources within the arena lighting system. In some embodiments the protocol message generator or mapping unit comprises or accesses a look-up-table wherein the control parameters (in the DMX message slots or DMX message frames) associated with the emulated light source are converted into control parameters associated with multiple light sources. The mapping is based on the location or direction of the actual light sources within the arena and the emulated light source control parameter values. In other words the light system interface protocol message generator 33 has knowledge on the light sources within the arena, for example their position and direction of illumination. Using this information and based on the first protocol message comprising control data or control parameters for the emulated light source a second protocol message or messages can then be generated. The second protocol message or messages comprising control data or control parameters in controlling the light sources within the arena can generate a visual effect which is based on the emulated visual effect which is designed to be generated by applying the first protocol message control parameters to the emulated light source. In some embodiments there can be performed a configuration/commissioning phase for the light system interface where a 2-D light intensity distribution of each luminaire in the stadium is determined in order that a mapping can be generated.

However it would be understood that in some embodiments the light system interface 3 protocol message generator 33 can be configured to generate the suitable protocol messages based on the first protocol message according to any suitable method (such as parsing the message based on knowledge of the personality file of the emulated light source and then generating the one or more second protocol messages based on the parsed message. Thus for each desired light pattern, the protocol message generator 33 can be configured to calculate the desired dim level (or other protocol message personality control parameter) of each and every luminaire in real-time and generates the desired (DMX) message frames and slots for the output. The messages are passed to an output 35.

The light system interface 3 furthermore comprises the output 35 configured to receive the second protocol message and output the protocol messages to the light system network of light sources. In some embodiments where the protocol messages are addressed to more than one network of light sources the output 35 can be configured to address the protocol messages to the correct network of light sources. In some embodiments the output 35 can be configured to output the protocol messages to lighting controllers 5.

The lighting system furthermore can comprise lighting controllers, shown in FIG. 1 as three daisy-chained lighting controllers 5a, 5b, 5c which are configured to receive the protocol messages. However, it would be understood that the number of lighting controllers can be fewer or greater than 3 in other embodiments. The lighting controllers are further configured to determine whether the protocol messages comprise control parameters or characteristics for a light source or luminaire controlled by the lighting controller. When the lighting controller 5a, 5b, 5c determines a message comprises a control parameter (such as a DMX message slot) for a light source or luminaire controlled by the lighting controller the lighting controller implements the control parameter or characteristic, for example controlling the dim level of the addressed light source, or the colour of the addressed light source by outputting the driving current to the light source (or to the colour components of the light source).

In the example shown in FIG. 1 each lighting controller 5a, 5b, 5c is configured to control two luminaires or light sources. However it is understood that each lighting controller 5a, 5b, 5c can be configured to control any number of luminaire or light sources. Furthermore in some embodiments the luminaire or light source has an integrated controller.

The lighting system as shown in FIG. 1 thus further comprises light sources or luminaires 7. In the example shown a first pair of light sources 7a, 7b are coupled to the first lighting controller 5a, a second pair of light sources 7c, 7d are coupled to the second lighting controller 5b and a third pair of light sources 7e, 7f are coupled to the third lighting controller 5c. It is understood that the number of light sources can be any suitable number of light sources. For example as described herein a typical arena pitch lighting system can comprise 300 light sources or luminaires. Each of the light sources or luminaires can be directed or beamed to point at a determined portion of the arena or pitch, wherein in some embodiments more than one light source or luminaire is directed or beamed at a specific determined portion of the arena or pitch in order to reduce the shadowing effect on the arena or pitch. Although the example provided in FIG. 1 is described with respect to a DMX protocol light system interface it would be understood that any other suitable lighting protocol message could be received and similarly any suitable lighting protocol message generated.

Figure 2:
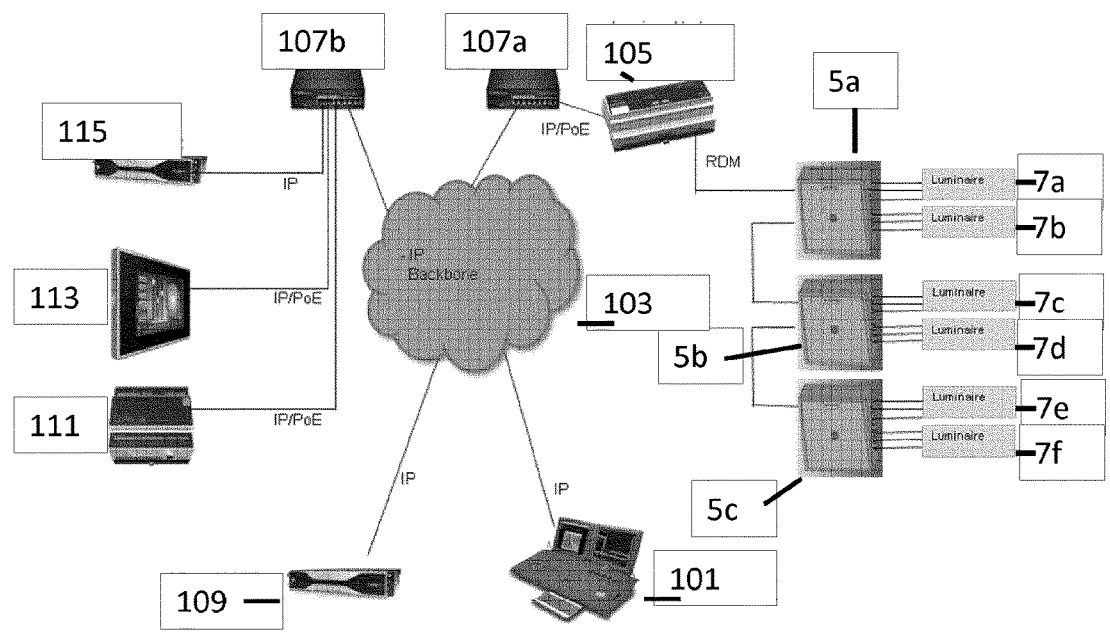
FIG. 2 shows an example lighting system comprising an Art-Net bridge light system interface according to some embodiments.

For example with respect to FIG. 2 a further example lighting system describing an IP communication protocol system, for example an Art-Net protocol light system interface 105, is shown. It is understood that any suitable IP communication protocol system may be used such as sACN, KiNet.

The lighting system as shown in FIG. 2 comprises a console or lighting controller 101 configured to generate suitable lighting protocol messages. For example the console or controller 1 can be configured to generate Art-Net protocol messages. An Art-Net protocol message, as described herein, is an IP/UDP (user datagram protocol) implementation of DMX and therefore comprises control parameters describing or defining the operation of a single emulated light. In the example herein the Art-Net message comprises a control parameters associated with an emulated light. The Art-Net message can be output via a suitable Internet protocol (IP) backbone 103 and suitable IP switch 107a to an IP or Art-Net light system interface 105.

The IP or Art-Net light system interface 107 is configured to receive the emulated light or light source control parameters within an Art-Net protocol message and output suitable protocol messages (such as DMX or Art-Net protocol message) to be output to controllers of individual light sources or luminaires within the arena. As described herein the IP or Art-Net light system interface 3 can be configured to generate suitable protocol messages based on the received control parameters for the emulated light source in a similar manner to that described with respect to the light system interface 3 described with respect to FIG. 1.

It is understood that although the emulated light or light source protocol messages can be generated from an event controller or console 101, the protocol messages can alternatively be generated from other sources, such as a virtual moving head bridge 109 simulating a moving head light source, an embedded PC 115 suitable for generating protocol messages, a touch panel control (TPC) 113, a lighting panel controller (LPC) 111 or other suitable controller.

Figure 3:
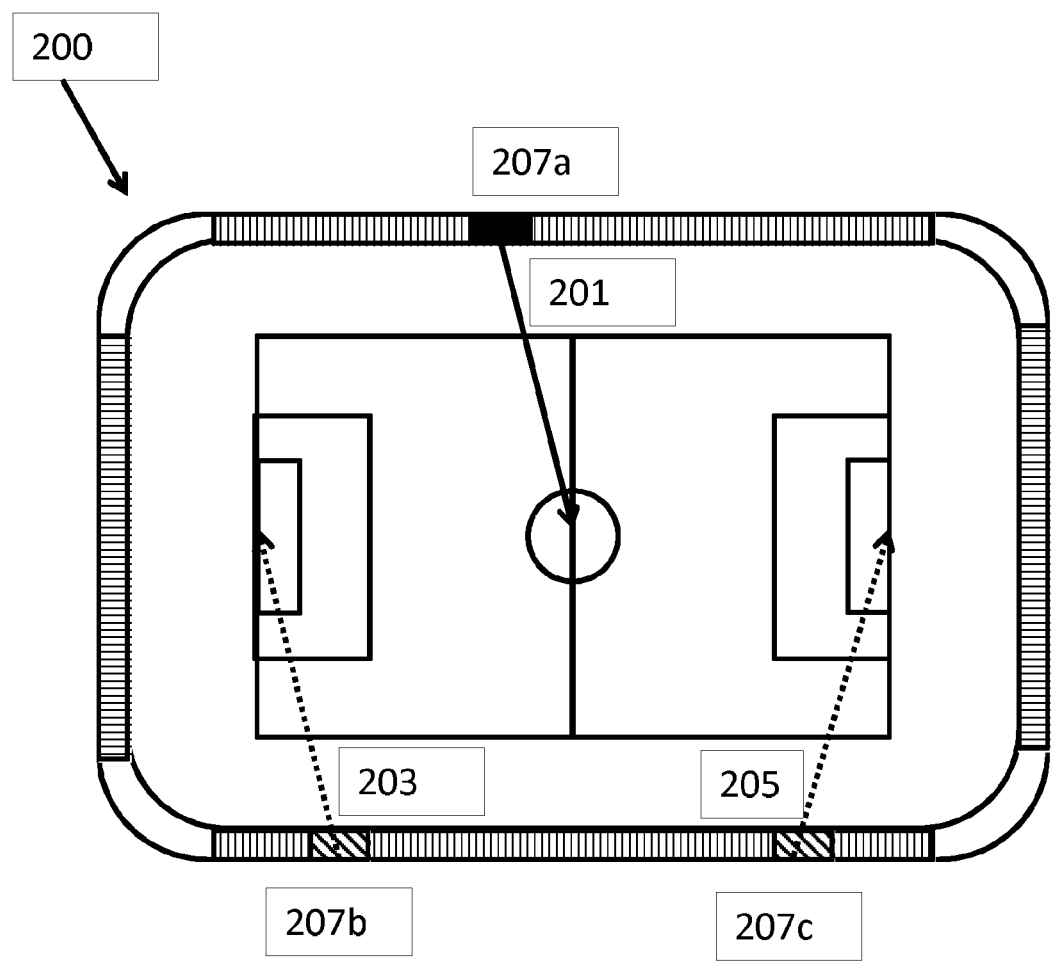
FIG. 3 shows an example lighting system application according to some embodiments.

With respect to FIG. 3 an example system to which the light system interface as described herein can be applied. FIG. 3 shows a schematic view of an arena 200 in the form of a football pitch. The arena has a lighting system, comprising multiple light sources, which are shown along the sides of the arena (though the light sources can be located in any suitable arrangement). The light sources or luminaires and drivers are connected via a suitable protocol (for example DMX) to the light system interface. The light system interface is configured to receive protocol messages (for example DMX frames) from a suitable controller/console, for example an event controller. These protocol messages (DMX frames) comprise at least 1 slot with a single or multiple control parameters associated with an emulated light source operating for the whole of the arena. According to the 8-bit nature of DMX this can be implemented for example by a first protocol message with 1 slot with a 8-bit dim control parameter or 2 slots with a 16-bit dim control parameter.

The light system interface, having knowledge of the lighting system with respect to the location and direction of the individual light sources, is configured to generate and output suitable 'second' protocol messages (DMX frames and slots) to the light sources or luminaires within the arena (or to the lighting controllers associated with the light sources or luminaires). In a first example the whole lighting system is 'offered' as a single emulated fixed position light source and the light system interface. In such embodiments the protocol message generator may receive from the input a first protocol message comprising a single control parameter dim element with a low dim value. In such embodiments the light system interface, e.g. the protocol message generator, can be configured to generate protocol messages which address the luminaires in the network or luminaires in the lighting system network and switch off all but a few luminaires. These few luminaires are controlled to be lit at or 'burning' at their minimum dim value.

The light system interface (the protocol message generator) may then when receiving protocol messages increase the 8- or 16-bit emulated light source dimmer value. The effect of this is that the protocol message generator can be configured to output protocol messages which switch on other luminaires in a suitable order. Furthermore when all luminaires are on at their minimum dim level, all subsequent increases in emulated dimmer values cause the light system interface, e.g. the protocol message generator, to generate protocol messages to the luminaires to increase the dim value in all luminaires.

For example the stadium light plan can have 270 luminaires (light sources) connected to the output of the light system interface at 270 different protocol (for example DMX) addresses. Furthermore the light system interface, e.g. the protocol message generator, in this example receives protocol messages (DMX frames) with an 8-bit dim value in DMX slot 1 (in other words a control parameter for an emulated light source with a first element of dim). The light system interface, e.g. the protocol message generator, can when receiving a message with a value 1 at the input in slot 1, be configured to generate a protocol message to one of the light sources 207a (one DMX slot out of 270 slots) to value 1 (e.g. the slot of the luminaire pointing to the centre of the pitch 201), and the protocol message to all other 269 slots (in the DMX output) containing a value zero (0). This causes the centre spot luminaire to light up at the luminaire minimum dim level and the others to be off.

The light system interface, e.g. the protocol message generator, can be configured, when receiving a message with a value 2 at the input in slot 1, to generate a protocol message to control more luminaires to light up. For example the luminaires or light sources 207b and 207c which are directed over the goals 203, 205 of the pitch have dim values 1 in their respective DMX slots as well as the centre-pitch luminaire 207a. As the dim input increases in DMX value, more and more luminaires are controlled to light up at their minimum dim level (in other words with a DMX value 1 in their slot) until all 270 luminaires are at their minimum dim level (and so the light system interface, e.g. the protocol message generator, can be configured to output a value 1 in all 270 DMX slots). The all at minimum illumination control message generation could occur for instance when the input dim value reaches 70. From an input dim value of 70 onwards all luminaires are then controlled to increase their dim value, with gradually increasing DMX values at the light system interface, e.g. the protocol message generator output. When the input protocol (DMX) message (slot 1) reaches 255, the light system interface, e.g. the protocol message generator, can be configured to control all 270 luminaires at 100%, so all slots at the output are also 255. It is understood that the "single-slider" stadium 'fade2black' effect can have enormous dynamic range making it desirable for the emulated light source, which could be labelled 'StadiumFadeToBlack' to have 16-bit resolution in the first protocol message.

A similar example can occur in an Art-Net bridge light system interface, for an arena with 270 luminaires individually controllable in universe 200. In a chosen or determined other universe, Art-Net frames are received by the light system interface, e.g. the protocol message generator with an 8-bit dim value (in DMX slot 1). For a dim value 1, only one luminaire pointing to the centre of the arena or sports field is controlled at a minimum dim level. In other words the light system interface, e.g. the protocol message generator, can be configured to generate protocol messages such that the output comprises a dim value 1 to that single luminaire address in universe 200. For a dim value 2, 2 more luminaires are controlled to be lit up at over the goals with dim value 1 in universe 200. At the other universe, slot 1 increases in dim value, more and more luminaires are controlled to be lit up at their minimum dim level (dim value 1 in universe 200) until all 270 luminaires are at their minimum dim level. For example the all luminaire minimum dim output can occur when the other universe/slot 1 has dim value 70. From 70 onwards the light system interface, e.g the protocol message generator, can be configured to control all luminaires to increase their dim value, with gradually increasing values in universe 200. When the other universe/slot 1 reaches a dim value of 255, all 270 luminaires are controlled to be operating at 100%, so all slots in universe 200 reach 255.

Figure 4:
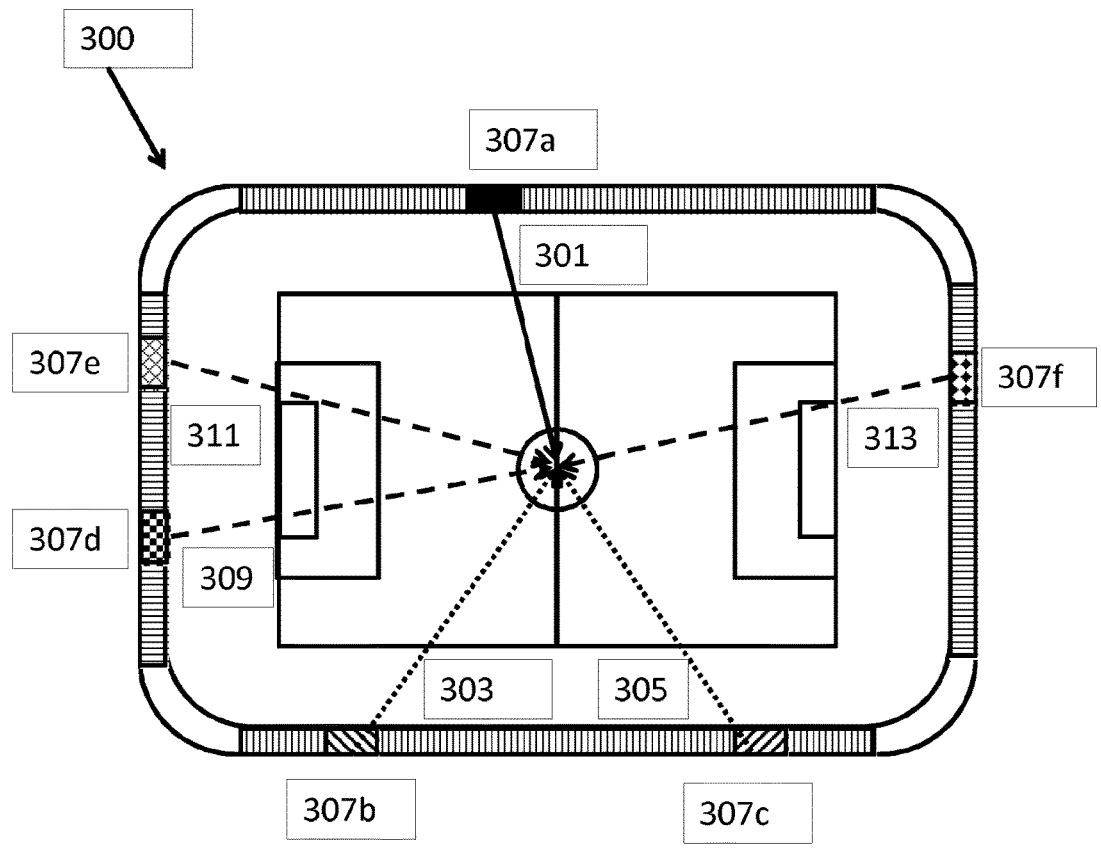
FIG. 4 shows a further example lighting system application according to some embodiments.

With respect to FIG. 4 a further example system to which the light system interface can be applied is described. FIG. 4 shows a schematic view of an arena 300 in the form of a football pitch. The arena has a lighting system, comprising multiple light sources, which are shown along the sides of the arena (though the light sources can be located in any suitable arrangement). The light sources or luminaires and drivers are connected via a suitable protocol (for example DMX) to the light system interface. The light system interface is configured to receive protocol messages (for example DMX frames) from a suitable controller/console, for example an event controller. These protocol messages (DMX frames) comprise at least 1 slot with a control parameter(s) for an emulated light source. Each control parameter is associated with emulated light sources representing a spot lighting effect at a determined location of the field, of which there can be many. According to the 8-bit nature of DMX each of the emulated light source spot dim control or dim elements within the frame can be implemented for example by a first protocol message with 1 slot with a 8-bit dim personality or 2 slots with a 16-bit dim personality. In the following examples the operation of the light system interface, e.g. the protocol message generator is described with respect to an emulated centre-spot or centre-field light spot. However it is understood that the same operations can be repeated with respect to any other spot or light areas. According to this example it is determined that there are six light sources or luminaires within the network of arena light sources which are directed at the centre-pitch/centre-spot area. These are light source 307a with direction 301, light source 307b with direction 303, light source 307c with direction 305, light source 307d with direction 309, light source 307e with direction 311, and light source 307f with direction 313. Although in this example there are six light sources directed to light a specific area or region there could be more than or fewer than six light sources. Furthermore it is understood that in some embodiments the number of light sources per lighting spot could vary across the arena or field.

The light system interface, e.g. the protocol message generator, can be configured to generate DMX frames to be output to the Luminaires. For the deepest dim level, the light system interface, e.g. the protocol message generator can be configured to generate a suitable protocol message with control parameters for all luminaires pointing to one spot on the field to switch off all but one luminaire. For example luminaire 307a could be lit at minimum levels while the others 307b, 307c, 307d, 307e and 307f are off.

When determining an increase in the 8 or 16-bit emulated dimmer value for the emulated spot light source, the light system interface, e.g. the protocol message generator, is configured to generate messages to 'switch on' the other luminaires 307b, 307c, 307d, 307e and 307f at their minimum dim level if the lumen step caused by that added luminaire is the desired increase. Alternatively, when determining an increasing the 16-bit emulated dimmer DMX value, the light system interface, e.g. the protocol message generator, is configured to lower the dim level of an already contributing luminaire while adding a next luminaire with minimum dim level, if that minimum addition would be too large for the desired lumen step.

For example, an arena or stadium light plan may have 270 luminaires lighting 45 spots on the sports field (such that each spot is lighted by 6 luminaires on average). In this example arena, the light system interface, e.g. the protocol message generator, can be configured to receive control parameters for 45 emulated luminaires with 16-bit dim capability, occupying a total of 90 DMX slots. A console in such example can quickly patch the 45 emulated luminaires to 45 sliders, without the need to do any programming. When the deepest dim level is requested, only 45 luminaires light the 45 spots on the field. When slightly increasing the dim level, those 45 luminaires increase their lumen output. Whenever another increase in 16-bit dim level allows for a second luminaire per spot, these switch in, potentially while lowering the output of the first luminaires if the step would otherwise be too large.

Figure 5:
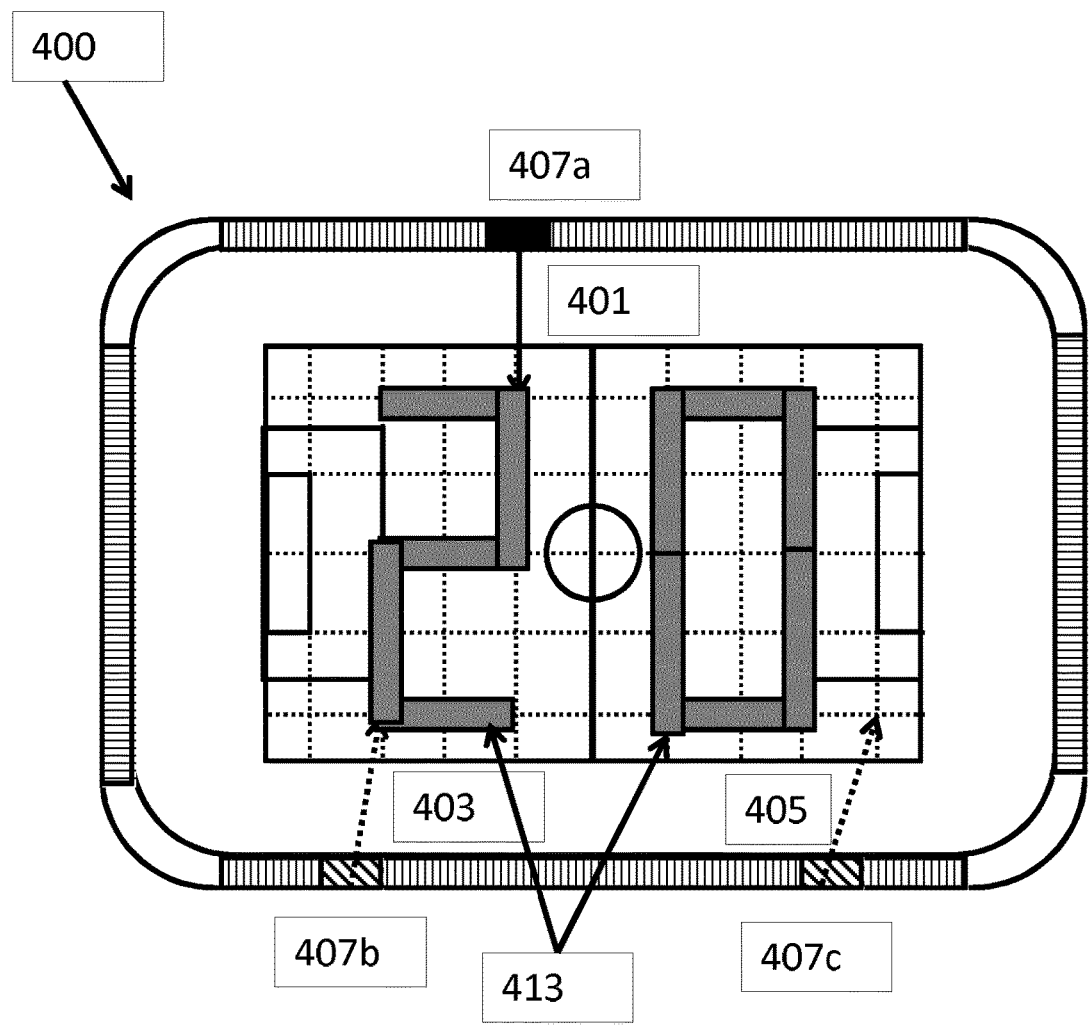
FIG. 5 shows another example lighting system application according to some embodiments.

In such a manner the light system interface, e.g. the protocol message generator, can be configured to generate a suitable 'message' on the pitch. For example each of the spots or lighting areas can be considered to be a 'pixel' of an image and as such by determining a dim level (or intensity) level for each pixel an image can be generated by the light system interface, e.g. the protocol message generator. For example with respect to FIG. 5 a 'pixel' image generation example application of the light system interface is described. FIG. 5 shows a schematic view of an arena 400 in the form of a football pitch. The arena has a lighting system, comprising multiple light sources, of which are shown along the sides of the arena (though the light sources can be located in any suitable arrangement. The light sources or luminaires and drivers are connected via a suitable protocol (for example DMX) to the light system interface. The light system interface is configured to receive protocol messages (for example DMX frames) from a suitable controller/console, for example an event controller. The controller could for example generate suitable values to luminaires such as 407*a* for a first pixel 401, 407*b* for a second pixel 403 and 407*c* for a third pixel 405 so to increase the dim values for spots which mark out the scores in a 7-segment display form 413 using an example 45 pixel resolution at a certain time. For example the score could be displayed following a goal being scored, at half time or after the end of the game. It is understood that in some embodiments the light system interface and in some embodiments the protocol message generator is configured to receive a protocol message comprising control parameters representing an emulated light source image filter to be displayed and generate the suitable protocol messages for the luminaires to generate the 'filter' image. It is understood that although the example shown herein is a 45 'pixel' image that any suitable 'pixel' image can be generated provided the light plan of the arena is able to generate the light spot pattern. Furthermore in some embodiments although that the control parameters are varied according to light intensity 'dim levels' in some embodiments a colour control parameter can be defined provided the light plan of the arena is able to generate the colour light spot pattern.

Figure 6:
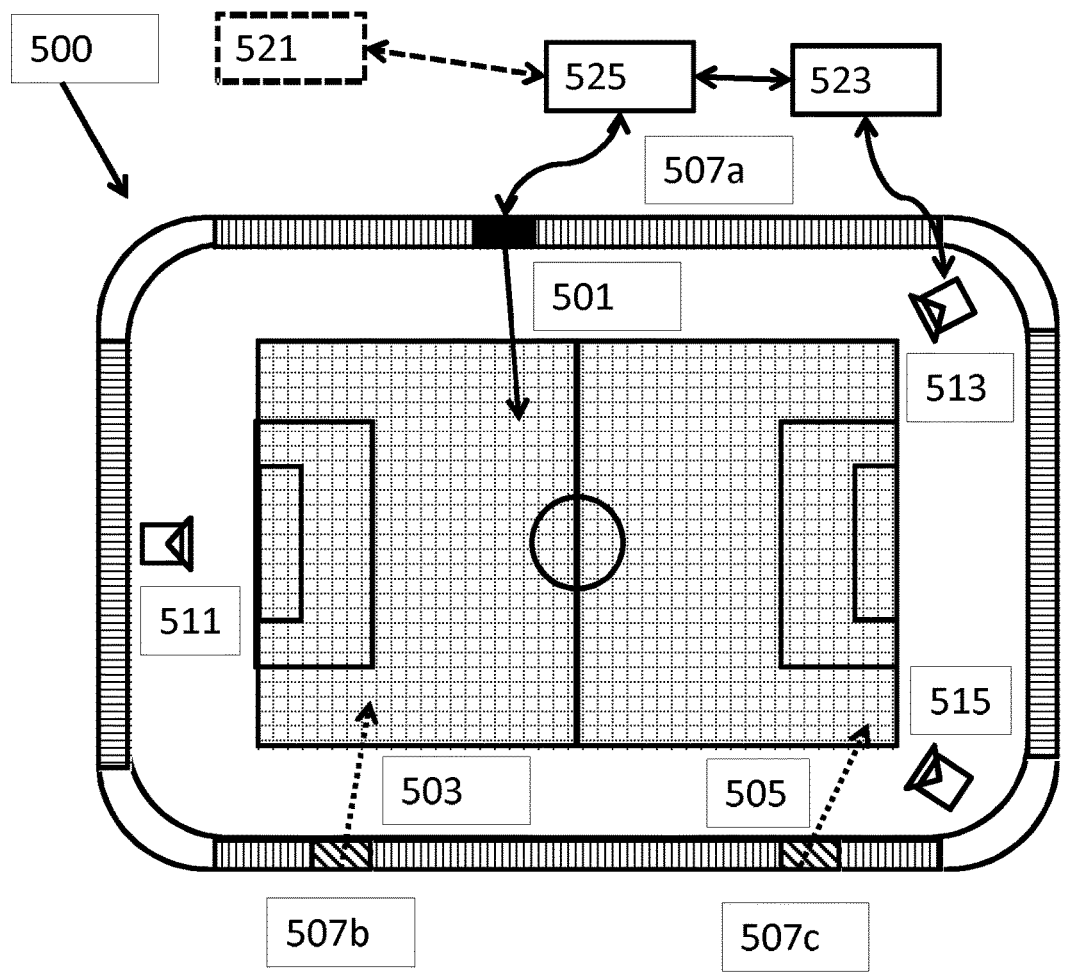
FIG. 6 shows a feature following lighting system application according to some embodiments.

With respect to FIG. 6 a further example application of the light system interface is described. FIG. 6 shows a schematic view of an arena 500 in the form of a football pitch. The arena has a lighting system, comprising multiple light sources, which are shown along the sides of the arena (though the light sources can be located in any suitable arrangement). The light sources or luminaires and drivers are connected via a suitable protocol (for example DMX) to the light system interface. The light system interface is configured to receive protocol messages (for example DMX frames) from a suitable controller/console, for example an event controller. These protocol messages (DMX frames) comprise at least 1 slot with a single emulated light source control parameter(s) wherein the emulated light source is an emulated moving head light source. These DMX frames are therefore frames with moving head control parameters, using 4 or more DMX slots to set dimvalue, focus, Pan, Tilt, and/or more. The light system interface, e.g. the protocol message generator is configured to implement multiple moving head emulated light source with their own control parameters as reflected by defined DMX slots, such that multiple moving head effects are combined on the sports field.

In such a manner the light system interface, e.g. the protocol message generator can be configured to dynamically operate all pitch lighting luminaires (for example luminaires 507*a* directed to a first area 501, 507*b* directed to a second area 503, and 507*c* directed to a third area 505 in such a way that they create a desired 2-D light intensity profile that follows a sports event or feature within the arena. In some embodiments the feature is the position of the ball and the light system interface and in some embodiments the protocol message generator are configured to generate protocol message such that the light follows the ball. However it would be understood that the feature can be any suitable feature such as a player, the referee, or any object on the field of play.

The luminaires are connected to the light system interface 525 and the protocol message generator is configured to receive the moving head control parameters within protocol messages from a control computer 523. The control computer 523 in some embodiments is configured to receive images generated by at least one camera, in the example shown in FIG. 6 three cameras 511, 513, 515 are shown located around the pitch. The control computer 523 in some embodiments is configured to determine the location of a desired feature, for example the location of the ball and generate a moving head emulated light source protocol (DMX) control output such that the desired light pattern is achieved. Furthermore in some embodiments the 'feature' is the position on the field shown in the centre of the image captured by the camera or cameras. A desired light pattern for example could be to generate a maximum intensity at the location of the (feature) ball diminishing to a 25% light level at a specific distance from the ball (for example 20 meters). As the (feature) ball moves around, the control computer 523 can update the light pattern by the DMX control lines within the arena 44 times per second such that the profile centre spot or focus tracks the ball.

It would be understood that the control computer 523 can further be configured to further determine the speed or other characteristics of the feature being followed. In such embodiments the speed of the feature is further configured to affect the moving head parameters, for example the focus distance could be directly or inversely be based on the speed, or the intensity of the focus could be directly or inversely be based on the speed of the feature.

The control computer 523 can be configured to determine the location of the (feature) ball based on triangulation of the images or any other suitable method. In some embodiments where only one camera is available then a focal line (of emulated moving head light sources) rather than a focus point can be defined. In some embodiments the focal line is configured to vary in intensity along a line from the camera location.

The emulated moving head light source protocol messages can be generated using a manual or semi-automatic controller 521. For example a user may have access to a joystick and 3 sliders to generate the emulated moving head light source protocol messages. The 3 sliders can be configured to determine or define the following:

1. Light level at the centre of the light pattern (or the focus), e.g. 2000 lux

2. Steepness of focus (width of light pattern), depth of focus, focus distance), e.g. 20 meters
3. Light level for the peripheral light pattern (or the out-of-focus area), e.g. 500 lux at any point beyond 20 meters from the focus.

In such embodiments the joystick determines the focal or focus point. This can for example be in such a way that the entire sports field is covered and the top right position of the joystick corresponds to a far right corner of the sports field, while the bottom left positions corresponds to the near left corner of the sports field. Such embodiments can for example be used by an assistant referee or judge to identify infringements or infringing play which has not been spotted by the referee. Control parameters may be determined based on other inputs such as for example light pattern shape. Thus for example an oval light pattern shape may be implemented using different light system lights than would be implemented using a circular light pattern shape.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

The invention claimed is:

1. A light system interface for controlling an arena light system including a network of arena light system light sources, the light system interface comprising:
    an input configured to receive a first protocol message, the first protocol message being configured to define at least one control parameter associated with an emulated light source, the at least one control parameter when performed on the emulated light source is designed to produce an emulated visual effect;
    a protocol message generator having knowledge on the arena light system light sources with respect to the location and direction of the individual light sources in said network and configured to generate at least one second protocol message based on the first protocol message, and using a mapping between the emulated light source and the network of the arena light system light sources including said knowledge, the at least one second protocol message being configured to define control parameters associated with a plurality of arena light system light sources within the arena light system; and
    an output configured to output the second protocol message to the network of arena light system light sources, such that the control parameters associated with the arena light system light sources are configured to enable the plurality of arena light system light sources to produce a visual effect based on the emulated visual effect;
    wherein the protocol message generator is further configured to generate the mapping based on information in an emulated light source DMX personality file, and information in at least one DMX personality file for a light source within the network of arena light system light sources.

2. The light system interface as claimed in claim 1, wherein the first protocol message comprises at least one first protocol message frame comprising a number of sequentially arranged message slots, wherein each of the at least one control parameters associated with the emulated light source is represented by at least one message slot within the at least one first protocol message, and wherein the second protocol message comprises at least one second protocol message frame each of the at least one second protocol message frames comprises a further number of sequentially arranged message slots, wherein each of the control parameters associated with the plurality of arena light system light sources is represented by at least one message slot within the at least one second protocol message.

3. The light system interface as claimed in claim 1, wherein the light system interface is a DMX bridge wherein the first protocol message is a DMX message and the second protocol message is a DMX message.

4. The light system interface as claimed in claim 1, wherein the light system interface is an Art-Net bridge wherein the first protocol message is an Art-Net message associated with a first universe value and the second protocol message is at least one of:
an Art-Net message associated with the first universe value;
an Art-Net message associated with a second universe value; and
a DMX message associated with a second universe value.

5. The light system interface as claimed in claim 1, wherein the emulated light source is a single dimmable fixture for the arena, and the plurality of light sources within the arena light system generate light at a determined area, wherein the protocol message generator is configured to map a first dim level value associated with the single dimmable fixture for the arena to at least one second dim level value associated with the plurality of the light sources within the arena light system.

6. The light system interface as claimed in claim 1, wherein the emulated light source is a multitude of dimmable fixtures aimed at determined areas within the arena, and the network of arena light system light sources comprises groups of light sources within the arena light system generating light at the determined areas, and the protocol message generator is configured to map a first dim level value associated with one of the multitude of dimmable fixtures aimed at one of the determined areas to at least one second dim level values associated with light sources within the groups of the light sources generating light at the one of the determined areas.

7. The light system interface as claimed in claim 1, wherein the emulated light source is at least one moving head fixture within the arena, and the network of arena light system sources comprises groups of light sources within the arena light system generating light at determined areas, and the protocol message generator is configured to map a first light beam location value or orientation value associated with the at least one moving head fixture to at least one second dim level value associated with the groups of the light sources within the arena light system directed at the location associated with the first light beam location value or orientation value.

8. A light system comprising:
a console/controller configured to generate the first protocol message;
a light system interface as claimed in claim 1; and
a plurality of light sources, each light source configured to receive an associated one of the second protocol messages.

9. The light system as claimed in claim 8, wherein the console/controller is configured to receive
a location identifier and wherein the first protocol message comprises a first control parameter based on the location identifier,
a second control parameter based on a centre of light pattern light level,
a third control parameter based on a peripheral light pattern light level, and
a fourth control parameter based on a light pattern width;
the light system interface protocol message generator being configured to generate the second protocol message comprising dim levels associated with the plurality of the light sources within the arena light system such that the light sources illuminate a focus area identified by the location identifier and the light pattern width at the centre of light pattern light level and illuminate the area outside the focus area at the peripheral light pattern light level.

10. The light system as claimed in claim 9, wherein the first protocol message further comprises: a fifth control parameter based on a light pattern shape, wherein the light system interface protocol message generator being configured to generate the second protocol message comprising dim levels associated with the plurality of the light sources within the arena light system further based on the light pattern shape.

11. The light system as claimed in claim 9, further comprising at least one of:
a location determiner configured to receive a user input and generate a location identifier to be sent to the console/controller;
a location determiner configured to receive at least one camera image and determine a location identifier based on a location of a feature in the at least one camera image.

12. A method of light system interfacing an arena light system comprising a network of arena light system light sources, the method comprising:
receiving a first protocol message comprising at least one control parameter associated with an emulated light source, the at least one control parameter when performed on the emulated light source being designed to produce an emulated visual effect;
generating at least one second protocol message based on the first protocol message and using a mapping between the emulated light source and a network of arena light system light sources including knowledge on the arena light system light sources with respect to the location and direction of the individual light sources in said network, the at least one second protocol message being configured to define control parameters associated with a plurality of the arena light system light sources; and
outputting the second protocol message to the network of arena light system light sources, such that the second protocol message is configured to enable the plurality of arena light system light sources to produce a visual effect based on the emulated visual effect;
wherein receiving a first protocol message comprises receiving a DMX message; and wherein generating a second protocol message based on the first protocol message comprises generating a DMX message;
wherein the mapping is based on information on an emulated light source DMX personality file, and information on at least one DMX personality file for a light source within the network of arena light system light sources.

13. The method as claimed in claim 12, wherein receiving a first protocol message comprises receiving an Art-Net message associated with a first universe value; and wherein generating a second protocol message based on the first protocol message comprises generating at least one of:
an Art-Net message associated with the first universe value;
an Art-Net message associated with a second universe value; and
a DMX message associated with a second universe value.

* * * * *